(12) United States Patent
Bertoncini et al.

(10) Patent No.: US 7,872,165 B2
(45) Date of Patent: Jan. 18, 2011

(54) METHODS OF HYDROTREATING A MIXTURE MADE UP OF OILS OF ANIMAL OR VEGETABLE ORIGIN AND OF PETROLEUM CUTS WITH INTERMEDIATE STRIPPING

(75) Inventors: Fabrice Bertoncini, Lyons (FR); Karin Marchand, Lyons (FR)

(73) Assignee: IFP Energies Nouvelles, Rueil Malmaison Cedex (FR)

( * ) Notice: Subject to any disclaimer, the term of this patent is extended or adjusted under 35 U.S.C. 154(b) by 460 days.

(21) Appl. No.: 11/962,760

(22) Filed: Dec. 21, 2007

(65) Prior Publication Data

US 2008/0161614 A1    Jul. 3, 2008

(30) Foreign Application Priority Data

Dec. 22, 2006   (FR) ................................. 06 11409

(51) Int. Cl.
*C07C 1/00* (2006.01)
*C10G 49/02* (2006.01)

(52) U.S. Cl. .................. 585/240; 585/310; 208/84; 208/100; 208/107; 208/111.35

(58) Field of Classification Search .............. 585/240, 585/310; 208/58, 107, 100, 84, 111.35
See application file for complete search history.

(56) References Cited

U.S. PATENT DOCUMENTS

| 4,992,605 | A | * | 2/1991 | Craig et al. | ................. 585/240 |
|---|---|---|---|---|---|
| 6,824,673 | B1 | * | 11/2004 | Ellis et al. | ....................... 208/58 |
| 7,232,935 | B2 | * | 6/2007 | Jakkula et al. | .............. 585/240 |
| 7,491,858 | B2 | * | 2/2009 | Murzin et al. | ................ 585/240 |
| 7,511,181 | B2 | * | 3/2009 | Petri et al. | .................... 585/240 |
| 7,540,952 | B2 | * | 6/2009 | Pinho et al. | .................. 208/108 |
| 7,626,063 | B2 | * | 12/2009 | Ghonasgi et al. | ............. 585/276 |
| 2006/0118466 | A1 | * | 6/2006 | Galeazzi et al. | .............. 208/210 |

FOREIGN PATENT DOCUMENTS

| EP | 1 396 531 A2 | 3/2004 |
|---|---|---|
| EP | 1 693 432 A | 8/2006 |

* cited by examiner

*Primary Examiner*—N. Bhat
(74) *Attorney, Agent, or Firm*—Millen, White, Zelano & Branigan, P.C.

(57) ABSTRACT

A hydrotreating method (HDT) utilizes two plants working under different operating conditions with an intermediate stripping for co-treating a mixture made up of oils of vegetable or animal origin and petroleum cuts (gas oil cuts (GO) and middle distillates) in order to produce gas oil fuel bases meeting specifications. The first plant (HDT1) is more particularly dedicated to the reactions concerning oils of vegetable or animal origin in comixture while pretreating the hydrocarbon feed, whereas the second plant (HDS2) works under more severe conditions to obtain diesel fuel according to standards, in particular in terms of effluent sulfur content, density and cold properties.

28 Claims, 3 Drawing Sheets

METHODS OF HYDROTREATING A MIXTURE MADE UP OF OILS OF ANIMAL OR VEGETABLE ORIGIN AND OF PETROLEUM CUTS WITH INTERMEDIATE STRIPPING

CROSS REFERENCE TO RELATED APPLICATION

This application is related to our concurrently filed application entitled "Methods Of Hydrotreating A Mixture Made Up Of Oils Of Animal Or Vegetable Origin And Of Petroleum Cuts With Quench Injection Of The Oils On The Last Catalyst Bed", Ser. No. 11/962,770 claiming priority of French application FR 06/11408 filed Dec. 12, 2006.

The present invention relates to methods of hydrotreating a feed made up of a mixture of oils of vegetable or animal origin combined with petroleum cuts in order to produce gas oil fuel bases.

FIELD OF THE INVENTION

Background of the Invention

In an international context characterized by a fast growth in fuel requirements, in particular gas oil bases in the European community, the search for new renewable energy sources that can be integrated in the conventional refining and fuel production scheme is a major challenge.

In this respect, integration in the refining process of new products of vegetable or animal origin, resulting from the conversion of lignocellulosic biomass or from the production of vegetable oils or animal fat, has known renewed interest as a result of the increase in the cost of fossil materials. Similarly, conventional biofuels (ethanol or vegetable oil methyl esters mainly) have acquired the status of complement to petroleum type fuels in gasoline pools. Furthermore, the processes known to date that use vegetable oils or animal fat are the cause of significant $CO_2$ emissions, known for their negative effects on the environment. A better use of these bioresources, such as their integration in the gasoline pool, would therefore be of great advantage.

The production of fuel bases is more and more identified as a new attractive outlet by the agricultural world, in particular by vegetable oil producers, these oils resulting from the crushing of oilseed such as rape, soybean or sunflower. In fact, these vegetable oils consist of fatty acids in form of triglycerides, with long alkyl chains whose structure corresponds to the normal paraffins of gas oil cuts (chain length from 12 to 24 carbon atoms, depending on the nature of the vegetable oil). Unsuitable for directly feeding modern diesel engines, these vegetable oils first have to be converted.

One existing approach is based on the reaction of transesterification with an alcohol such as methanol, leading to vegetable oil methyl esters (VOME) commonly referred to as biodiesel. This option is now widely used in Europe since the production of VOME has increased very significantly during the past ten years, thus reaching 1.5 Mt in 2003 (the average yearly growth rate is 35% between 1992 and 2003). This production is notably supported by the European directive on the promotion of biofuels (2003/30/CE) that sets increasing biofuel consumption objectives in the field of transport. These consumptions will have to be at the minimum 2% in 2005, 5.75% in 2010 and 8% (percentages measured in energy) in 2015 of the overall consumption of gasoline and gas oil used for transport. However, this type of process is relatively expensive and it requires vegetable oil type limitations in order to meet the biodiesel specifications. Besides, the feeds for this type of process must be carefully selected, so that a certain number of vegetable oils cannot be treated in this manner. Finally, the cold properties of these products also represent a limiting factor.

Another approach consists in directly using vegetable oils via their conversion to elementary fatty acid derivatives, by means of hydrorefining or hydroconversion processes whose catalysts are also known to the person skilled in the art for their hydrodeoxygenation properties [E. Laurent, B. Delmon, Appl. Catal. A 109 (1) 1994 77-96 and 97-115]. In this case, the triglycerides are converted to mainly paraffinic and saturated derivatives, thus forming excellent bases for the gas oil pool considering their good cetane numbers.

There is therefore a strong need of the petroleum refining industry to treat oils of vegetable or animal origin, if possible at a lower cost and while taking account of the existing plants.

Several patents cover these fields of interest.

U.S. Pat. No. 5,233,109 describes the implementation of thermal or catalytic cracking of vegetable oils leading to a wide range of products such as paraffins, but also aromatic derivatives and unsaturated derivatives in the boiling range of gasolines and gas oils. This method produces derivatives that cannot be directly used as gas oil fuel bases and it is particularly penalizing as regards meeting standard specifications (oxidation stability).

U.S. Pat. No. 4,992,605 and U.S. Pat. No. 5,705,722 describe methods of producing bases for the gas oil pool produced from direct conversion of vegetable oils (rape, palm, soybean, sunflower) or of lignocellulosic biomass to saturated hydrocarbons after hydrotreatment or hydrorefining of these products alone.

The conversion methods described are operated at pressures ranging between 0.48 and 1.52 MPa and at temperatures ranging between 350° C. and 450° C. allowing to obtain products with a high cetane number. The pro-cetane additives thus obtained are mixed with the gas oil in proportions of 5 to 30% by volume.

These two patents have the major drawback of a high hydrogen consumption due to the methanation reactions or to water-gas shift reactions. Furthermore, the oxygen contained in the triglycerides is generally decomposed by hydrodeoxygenation in the presence of a hydrotreating catalyst, which is costly in hydrogen.

In this respect, patent EP-1,681,337 represents an improvement since it provides a method using only small amounts of hydrogen. It is a decarboxylation/decarbonylation method on group VIII catalysts first reduced to a temperature ranging between 100° C. and 500° C. The reactions are then carried out at a temperature ranging between 200° C. and 400° C. at a pressure ranging between 1 and 15 MPa. In this case, the decarboxylation/decarbonylation reaction produces saturated hydrocarbons and $CO_2$ or CO respectively. Hydrogen is no longer necessary, except for keeping the catalytic phase in metallic form and/or for preserving the catalyst from too fast a deactivation.

The products formed are not directly used as fuel bases because of their very poor cold resistance properties.

In order to overcome these limitations on the cold properties, other patents describe a sequence of a stage of hydrogenation and isomerization of vegetable oils so as to obtain a mixture of branched saturated hydrocarbons whose cold properties are known to be higher than those of the same compounds, but non-branched. Patent FI-100,248 relates to the hydrogenation of fatty acids or triglycerides to n-paraffins, followed by an isomerization stage. Patent EP-1,396,531 describes a hydrotreating method for carrying out hydrodeoxygenation under a pressure of 5 to 10 MPa and at a temperature of 300° C. to 500° C., followed by an isomerization stage at a pressure of 2 to 10 MPa and a temperature of 300° C. to 400° C.

Finally, patent EP-1,693,432 describes a method allowing hydroconversion of a mixture of vegetable oils (1% to 75% by volume) and of hydrocarbons (99% to 25% by volume) in a single hydrotreating reactor, at a pressure of 4 MPa to 10 MPa, with a NiMo or CoMo type catalytic bed operated at a temperature ranging between 320° C. and 400° C. The advantage of this approach is the gain in terms of cetane number and of density decrease provided by mixing with the vegetable oil in relation to the properties obtained by direct treatment of the petroleum base. Furthermore, mixing hydrocarbon feeds with vegetable oils allows to improve the cold properties of the effluents obtained in comparison with those that would be obtained by treating the vegetable oils alone. The hydrotreating catalysts used are group VIB transition metal sulfides promoted by group VIII metals. The presence of compounds from non-desulfurized petroleum cuts allows to obtain a higher $H_2S$ partial pressure than the minimum partial pressure necessary for the catalyst stability.

The drawback of this method lies in the implementation of a single stage for co-treating the vegetable oil and the petroleum base. In fact, this is limiting as regards optimum operation of hydrotreating catalysts intended to operate the decarboxylationdecarbonylation, hydrodeoxygenation and hydrodesulfurization reactions simultaneously. Now, the operating conditions allowing to promote the decarboxylation and decarbonylation reactions and a lower hydrogen consumption in relation to hydrodeoxygenation are milder than those required to obtain the desired effluent sulfur specifications.

Besides, the activity and the stability of the catalyst as used in this patent are penalized because of the formation of the coproducts of the hydrodeoxygenation and decarboxylation and/or decarbonylation reactions, i.e. water and CO and/or $CO_2$. These molecules are in fact well known to the person skilled in the art for their deactivation and inhibition effects respectively on hydrotreating catalysts (US-2003/0,221, 994).

It would therefore be interesting to be able to do without these coproducts so as to allow a better catalyst activity while limiting the presence of inhibitors and a longer cycle time of the plant (catalyst stability while limiting the harmful effects due to the presence of water). Co-treatment of the petroleum base and of the vegetable oil thus leads to fast catalyst aging and to a degradation of the hydrodesulfurization performances of the catalysts. In particular, this patent does not mention hydrodesulfurization performances of the process or the quality of the products formed in relation to all the standard specifications for gas oil fuels. Considering the cost of the loading and unloading operations, as well as the cost of the raw material for the catalysts and recycling thereof, it is important for refiners to maximize the cycle time of the plant and consequently the life of the hydrotreating catalyst allowing to obtain gas oils meeting specifications.

The orientation of the vegetable oil conversion mechanism (hydrodeoxygenation or decarboxylation/decarbonylation) is difficult under the operating conditions required to carry out hydrodesulfurization of the gas oil base. Now, this selection is very important in terms of hydrogen consumption. In fact, it is not unknown to the person skilled in the art that the hydrogen consumption remains a critical parameter, considering its low availability in refineries. It is therefore important to minimize its consumption. The fact that the optimum operating conditions differ for the desired reactions is thus greatly limiting in the case of co-treatment of vegetable and petroleum oils carried out in a single stage.

There is therefore an industrial and environmental need to improve the co-treatment conditions of oils of vegetable or animal origin and of petroleum bases in order to produce gas oil fuels.

The use of an intermediate stripping between two reaction sections is described notably in patent application WO-2003/044,131 A1 filed by the applicant. In this method, the hydrogen is introduced in excess in the first hydrotreating reactor so as to convert to $H_2S$ the major part of the sulfur compounds contained in the feed. After separation and rectification, only the liquid part having a limited amount of sulfur is sent to the second hydrotreating plant. The advantage of this method is thus to limit the inhibition effect due to the presence of $H_2S$ on the second catalytic bed. The first reactor performs the largest part of the conversion, whereas the second one acts as a finishing reactor. Introduction of a second reactor and of an intermediate stripping therefore does not allow to carry out different reactions in the plants and does not involve a decrease in the hydrogen consumption.

SUMMARY OF THE INVENTION

The invention relates to a hydrotreating method using two plants (HDT1 and HDS2) in series with an intermediate stripping allowing to co-treat a mixture made up of oils of vegetable or animal origin (1 to 99% by volume) and of petroleum bases (99% to 1%) resulting from distillation or from a conversion plant in order to produce gas oil fuel bases directly meeting specifications, notably in terms of sulfur, density and cold resistance properties.

Advantageously, implementation of the method according to the present invention allows to reduce the cost of the treatment of oils of vegetable or animal origin to obtain gas oils meeting the specifications in comparison with a plant specifically dedicated to this type of oils such as, for example, a transesterification plant, by integrating their treatment in an existing refining scheme with an existing hydrodesulfurization plant (HDS2), while limiting the hydrogen consumption in comparison with a mixture co-treatment scheme in a single stage.

It also allows to use a wider range of oils of vegetable or animal origin.

The activity and the stability of the distillate hydrotreating catalyst used in the hydrodesulfurization plant (HDS2) are improved by means of the use of a new plant (HDT1) for pretreating the mixture of oils of vegetable or animal origin and of petroleum cut upstream from the hydrodesulfurization plant, and of an intermediate stripping (103).

DETAILED DESCRIPTION

Figure 1:
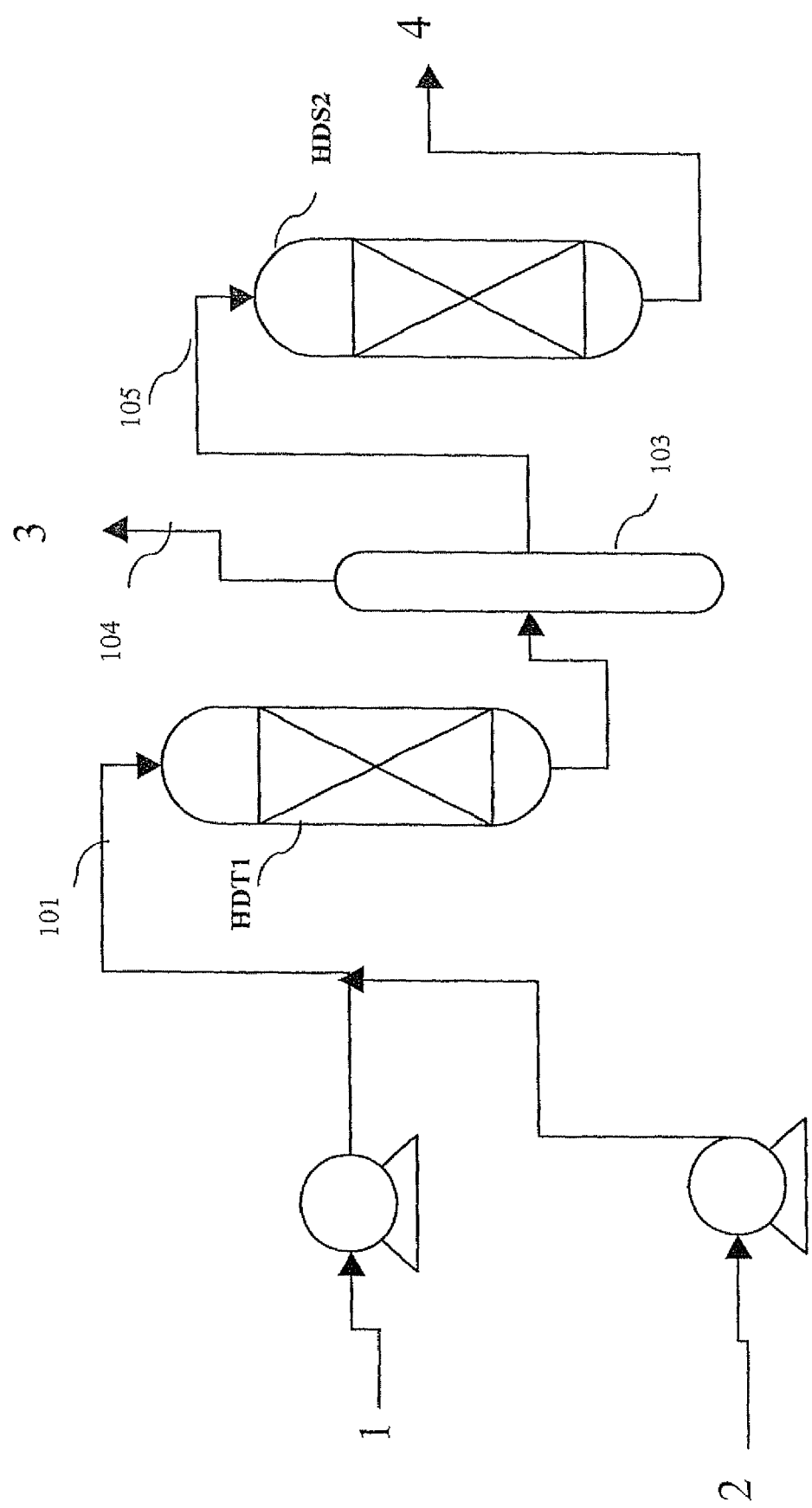
FIG. 1 shows a process layout according to the invention.

The method according to the present invention is a hydrotreating process using two plants HDT1 and HDS2 in series with an intermediate stripping, in order to co-treat a feed made up of a mixture consisting of oils of vegetable or animal origin (1 to 99% by volume) and of petroleum bases (99 to 1% by volume respectively). The product obtained after co-treatment meets at least the imposed 2005 sulfur specifications and it therefore contains less than 50 mg/kg sulfur, preferably less than 10 mg/kg sulfur: it can be directly used as a gas oil fuel base.

Advantageously, the mixture consists of 1 to 50% oils of animal or vegetable origin and of 99 to 50% petroleum bases.

During hydrotreatment (HDT), the reactions undergone by the feed are as follows:

the decarbonylation reaction represents all of the reactions allowing to remove an oxygen and a carbon from a carboxylic group by forming carbon monoxide, the decarboxylation reaction represents all of the reactions allowing to remove a carboxyl group from a carboxylic group by forming carbon dioxide, the hydrodeoxygenation reaction corresponds to the reactions leading to the formation of water in the presence of hydrogen.

What is referred to as hydrodesulfurization (HDS) are the reactions allowing to remove the sulfur from the petroleum feed with production of $H_2S$.

What is referred to as denitrogenation (HDN) are the reactions allowing to remove the nitrogen from the petroleum feed with production of $NH_3$.

Each stage can comprise one or more reactors, one or more catalytic zones (or beds), and use identical or different catalysts. It is thus possible to adjust the treating conditions in each plant and/or zone. Thus, hydrotreatment of the mixture of vegetable or animal oils and of hydrocarbons can be carried out at a lower temperature and pressure than the final hydrodesulfurization.

Another advantage of the method according to the invention is to provide an economic gain in comparison with methods operating in a single stage (mild hydrotreating conditions, elimination of the deep hydrodesulfurization inhibitors) and a greater process operation latitude in terms of catalytic system association for the first and the second bed.

In particular, the orientation of the vegetable or animal oil conversion mechanism during the first hydrotreatment stage HDT1 can be controlled: this conversion can be achieved through either the hydrodeoxygenation option, highly hydrogen-consuming, or through the decarboxylation and/or decarbonylation option. This orientation is thus important not only in terms of hydrogen consumption, but also in terms of $CO_2$ produced. In fact, within the context of a better respect of the environment, the $CO_2$ emissions now have to be restricted.

Intermediate stripping (103) allows to avoid the presence of carbon monoxide (CO), of carbon dioxide ($CO_2$) and of water ($H_2O$) resulting from hydrotreatment of the triglycerides that make up the oil of vegetable or animal origin on the first catalytic bed (HDT1), prior to the final desulfurization stage (HDS2). These compounds being known for their deactivation and/or inhibition effects, stripping allows to obtain a higher activity of the catalyst used during the desulfurization stage HDS2. Furthermore, the presence of these compounds, by dilution effect, reduced the partial hydrogen pressure of plant HDT1 in relation to what it might have been without the decarbonylation, decarboxylation and hydrodeoxygenation reactions. Intermediate stripping therefore allows not to penalize the activity and the stability of the catalyst in plant HDS2 in this respect. Finally, this second stage is thus all the more facilitated as stripping also allows to eliminate the hydrogen sulfide ($H_2S$) and the ammonia ($NH_3$) also formed during the first feed hydrotreating stage during which reactions of hydrodesulfurization, hydrogenation and hydrodenitrogenation of the compounds derived from the petroleum oil occur.

The initial ratio between the oil of vegetable or animal origin and the petroleum base is adjusted by the operator in order to reach, after the second stage, a fuel meeting the standard specifications according to the desired sulfur contents and the standard properties by combining the gain in terms of cetane number and density decrease, and the cold resistance degradation.

Finally, the method according to the invention possibly allows, in order to limit the inhibition of the catalytic system during the first stage HDT1, generated by the production of CO, to operate the first reactor on a counter-current basis for hydrogen introduction. In fact, the method using a fixed bed, there is a concentration gradient of the gas produced to the reactor bottom. Counter-current hydrogen introduction allows, on the one hand, dilution of these poisons and, on the other hand, a better catalyst activity by increasing the $H_2$/HC ratio at the point where the inhibitor concentration is the highest.

The feeds used on the one hand consist of fatty matter and therefore correspond to a natural or elaborate substance of animal or vegetable origin, mainly containing triglycerides. This essentially involves oils from renewable resources such as fats and oils from vegetable and animal resources (such as lard, tallow, fowl fat, bone fat, fish oil and fat of dairy origin), as well as the compounds and the mixtures derived therefrom, such as fatty acids or fatty acid alkyl esters. The products resulting from recycling of animal fat and of vegetable oils from the food processing industry can also be used, pure or in admixture with other constituent classes described above.

The preferred feeds are vegetable oils from oilseed such as rape, erucic rape, soybean, sunflower, palm, copra; palm-nut, arachidic, olive, corn, cocoa butter, nut, linseed oil or oil from any other vegetable. These vegetable oils very predominantly consist of fatty acids in form of triglycerides (generally above 97% by weight) having long alkyl chains ranging from 8 to 24 carbon atoms, such as butyric fatty acid, caproic, caprylic, capric, lauric, myristic, palmitic, palmitoleic, stearic, oleic, linoleic, linolenic, arachidic, gadoleic, eicosapentaenoic (EPA), behenic, erucic, docosahexaeoic (DHA) and lignoceric acids.

The fatty acid salt, fatty acid alkyl ester and free fatty acid derivatives that can be produced by hydrolysis, by fractionation or by transesterification for example of triglycerides or of mixtures of these oils and of their derivatives also come into the definition of the "oil of vegetable or animal origin" feed in the sense of the present invention.

The feeds that are particularly preferred are vegetable rape oil, erucic rape, soybean, sunflower or oleic sunflower oils (predominantly C18 fatty acids), palm oils (predominantly C16 fatty acids), copra and palm-nut oils (predominantly C12-C14 fatty acids), or mixtures of these oils and of their derivatives.

On the other hand, the typical hydrocarbon feed of the method according to the invention is a middle distillate feed. In the sense of the present description, the term middle distillate designates hydrocarbon fractions whose boiling point temperature ranges between about 130° C. and about 410° C., generally between about 140° C. and about 375° C. and, for example, between about 150° C. and about 370° C. A middle distillate feed can also comprise a gas oil or diesel cut, or it can be referred to by one of these designations. Straight-run gas oils or gas oils obtained from catalytic cracking (LCO) or from any other conversion process (coking, visbreaking, residue hydroconversion, . . . ) constitute a part of the typical feeds of the method according to the invention.

Operating Conditions

Plant 1: Mild Hydroconversion of Oils of Vegetable or Animal Origin in Comixture with Petroleum Oil The operating conditions applied in the method according to the invention are as follows: temperature ranging from 180° C. to 360° C. (preferably from 190° C. to 350° C.), total pressure from 0.5 to 20 MPa (preferably between 1 and 10 MPa), an hourly space velocity (defined as the unit volume of gas/volume of catalyst) from 0.1 to 20 $h^{-1}$ (preferably between 0.2 and 5 $h^{-1}$), a hydrogen/feed ratio expressed in volume of hydrogen, measured under the normal temperature and pressure conditions, per volume of liquid feed generally ranging from 50 Nl/l to 2000 Nl/l. This hydrogen can possibly consist of a proportion ranging from 100 to 1% by volume of recycle hydrogen from the hydrodesulfurization plant.

Plant 2: Deep Hydrodesulfurization

The operating conditions applied in these processes are usually as follows: temperature ranging from 180° C. to 450° C. (preferably between 250° C. and 440° C.), total pressure from 0.5 to 30 MPa (preferably between 1 and 25 MPa), an hourly space velocity from 0.1 to 20 $h^{-1}$ (preferably between 0.2 and 4 $h^{-1}$), a hydrogen/feed ratio expressed in volume of hydrogen, measured under the normal temperature and pressure conditions, per volume of liquid feed generally ranging from 50 Nl/l to 2000 Nl/l.

Preheating of the feed containing at least the hydrocarbon feed can be carried out by any means known to the person skilled in the art prior to feeding it into hydrotreating plant HDT1. Without limiting the scope of the invention, the use of heat exchangers and/or of preheat furnaces can also be mentioned.

The vegetable or animal oil and the petroleum feed can be mixed at various points of the process layout.

A first possibility consists in injecting the vegetable or animal oil after preheating the petroleum cut by passage, in the presence of hydrogen, through a feed-effluent exchanger, then a preheat furnace.

A second method consists in mixing the petroleum cut and the feed made up of vegetable oil in the presence of hydrogen after preheating the petroleum cut by passage through a feed-effluent exchanger from the first plant HDT1. In this case, mixing of the petroleum feeds and of the oil can optionally be completed by passage through a preheat furnace.

Finally, the vegetable or animal oil and the petroleum cut can also be mixed in the presence of hydrogen prior to heating, in which case the temperature of the mixture is increased first by passage through a feed-effluent exchanger, then possibly through a preheat furnace.

The feeds can also be mixed together prior to the introduction of hydrogen or a posteriori. Preferably, mixing the vegetable or animal oil with the hydrocarbon feed occurs in the presence of hydrogen, either before the feed-effluent exchanger, before the preheat furnace or before entering the reactor. More preferably, mixing the vegetable oil with the hydrocarbon cut occurs in the presence of hydrogen after raising the temperature of the petroleum feed by means of at least one heating stage.

Plant HDS2 operates under more severe conditions than plant HDT1. It is therefore necessary to have, after the stripper, an equipment allowing the temperature of the products coming from the stripper to be raised. This can be done by means of various equipments known to the person skilled in the art, such as feed-effluent exchangers or a preheat furnace.

The method according to the invention is described below in connection with FIG. 1 showing a process layout. In this diagram, the feed preheating stages are not shown.

The feed consisting of oil of vegetable or animal origin (1) is mixed with the petroleum cut (2). The mixture is fed through line (101) into first treating plant HDT1 (102). The outgoing effluent is then directly sent to intermediate stripper (103). Line (104) allows to eliminate the coproducts (3) obtained after the different reactions during the hydrotreatment performed under mild operating conditions ($H_2O$, CO and/or $CO_2$, as well as $H_2S$ and $NH_3$). The effluent recovered after stripping is sent through line (105) to second hydrotreating plant HDS2 (106) where deep hydrodesulfurization is carried out. At the outlet of this plant, a gas oil fuel base (4) meeting the specifications is collected.

An important specification for a diesel fuel mentioned in specification standard EN590 is the cetane number value of 51 according to the ASTM D613 standard, which represents the self-ignition properties of the fuel in the engine running mode.

This parameter very clearly shows the advantage of this method that provides a very appreciable cetane number increase by means of the co-treatment in admixture of a petroleum base and of a vegetable oil, according to the nature of the vegetable oil and of the petroleum base.

Furthermore, the gain of the method is obtained even with limited vegetable oil additions.

The cetane number gain closely depends on the stability of the first hydrotreating stage: cracking phenomena have to be prevented so as to keep paraffinic derivatives having long alkyl chains.

Catalysts

The hydrotreating catalysts used within the scope of the invention generally include at least one metal from group VIB and/or at least one metal from group VIII of the periodic table of elements. The commonest formulations are of cobalt-molybdenum (CoMo), nickel-molybdenum (NiMo) and nickel-tungsten (NiW) type.

These catalysts can also be doped by means of compounds such as phosphorus, boron and/or fluorine. They can come in massive form or in the supported state. In the latter case, the porous matrix is generally an amorphous, poorly crystallized or even crystallized oxide.

By way of example, without limiting the scope of the invention, the supports are typically alumina, activated charcoal, silicon carbide, titanium oxide.

After preparation, said catalysts often come in form of an oxy-hydroxide or an oxide depending on whether the catalyst used is a dried catalyst (volatile content>15% by weight for a temperature of 550° C.) or a calcined catalyst (volatile content≦15% by weight for a temperature of 550° C.).

Their active and stable form for hydrotreating processes being the sulfur form, these catalysts must undergo a sulfurization stage. This stage can be carried out in the hydrotreating plant itself (in-situ sulfurization) or prior to feeding the catalyst into the plant (ex-situ sulfurization).

For both plants, the catalyst is sulfurized after or before feeding into the plant considered using any method known to the person skilled in the art, whether gas phase or liquid phase sulfurization by means of a sulfurizing agent incorporated in the feed. The catalyst is preferably sulfurized in situ in the liquid phase.

The examples hereafter illustrate the invention without limiting the scope thereof.

EXAMPLES

The following examples clarify the invention without limiting the scope thereof.

Example 1

Single-Stage Method of Hydrotreating a Mixture Made Up of Vegetable Oils and of a Petroleum Cut Co-treatment of a mixture made up of a straight-run gas oil and of a rape oil was carried out in a fixed-bed isothermal plant of descending flow type containing 50 cc catalyst of $CoMo/Al_2O_3$ type in dense loading.

The petroleum feed used is a straight-run gas oil from a Middle East crude whose characteristics are as follows:

| | |
|---|---|
| Density at 15° C.: | 0.8522 |
| Sulfur: | 1.35% by weight |
| Nitrogen: | 126 mg/kg |
| Simulated distillation: | |
| PI: | 155° C. |
| 10% by weight: | 247° C. |
| 50% by weight: | 315° C. |
| 90% by weight: | 392° C. |
| PF: | 444° C. |

After in-situ sulfurization at 350° C. in the plant under pressure, carried out by adding 2% by weight of dimethylsulfide to the gas oil feed used, hydrotreatment was then performed for 140 h under the following operating conditions:

| | |
|---|---|
| Total pressure (MPa rel): | 4 MPa |
| Temperature (° C.): | 350 |
| $H_2$/HC (Nl/l): | 320 |
| HSV ($h^{-1}$): | 1.6 |

The properties of the effluents obtained are given in Table 1.

The test feed was then modified so as to obtain a mixed feed containing 5% by weight of rape oil. It can be noted that the density of the products is lower than that obtained with a petroleum cut to which no vegetable oil has been added. The sulfur contents of the effluents are also greatly affected by the presence of 5% by weight of rape oil in the hydrocarbon feed since the effluent sulfur content changes from 76 mg/kg to 400 mg/kg. This corresponds to a 13° C. deactivation, which means that in the presence of 5% by weight of rape oil in the feed, the plant should be operated 13° C. higher to have the sulfur content of the effluents of 76 mg/kg. This trend is confirmed when the "rape oil/straight-run gas oil" proportion of the feed is increased. In fact, as shown in Table 1, for 15% by weight of rape oil in the feed, the sulfur content of the effluents is 582 mg/kg, which corresponds to a 16° C. deactivation.

Thus, co-treatment of a straight-run gas oil with a vegetable oil is highly penalizing for the hydrotreating catalyst activity and for the required sulfur specifications.

The same remark applies to the nitrogen contents of the effluents.

Besides, the hydrogen consumption was measured for the co-treatment in a single stage of straight-run gas oil and for a mixture with a variable proportion of rape oil. As can be seen in Table 1, the hydrogen consumption increases by about 35% in relation to the hydrogen consumption for a straight-run gas oil hydrotreatment. This increase is mainly due to the fact that, under these operating conditions, hydrodeoxygenation is favoured in relation to the decarboxylation and/or decarbonylation reactions.

Analysis of the effluent products shows that the co-treatment of straight-run gas oil and of rape oil allows to obtain effluents with a higher cetane number, but limit cold resistance properties in relation to the EN 590 specification for automotive gas oils (in particular for the cold filter-plugging point (CFPP) set at 0° C.). However, these properties are greatly improved in relation to those of the initial vegetable oil (CFPP of about 20° C.) or of the effluent from the hydrotreatment alone of vegetable oil (CFPP of 20° C. also).

In conclusion, the effluents obtained by single-stage co-treatment of a straight-run gas oil with a vegetable oil have high cetane number values but they penalize the gas oil pool on the cold properties specifications, requiring the use of dedicated additives.

Finally, carrying out a turning point with a feed made up of 100% straight-run gas oil allows to measure the catalyst deactivation due to the use of a feed containing rape oil.

As shown in Table 1, the effluent sulfur and nitrogen contents are higher than those obtained initially for this feed. Thus, a deactivation of the order of 5° C. has been measured. The lower performances of the catalyst would thus lead to a fast increase in the operating temperature and eventually to a decrease in the catalyst cycle time in the plant.

TABLE 1

| Single-stage hydrotreatment of a mixture of rape oil and of straight-run gas oil | | | | |
|---|---|---|---|---|
| Feed | Pure straight-run gas oil | Straight-run gas oil in comixture with rape oil (95/5% wt) | Straight-run gas oil in comixture with rape oil (85/15% wt) | Pure straight-run gas oil (return point) |
| Conditions | | | | |
| Catalyst age (h) | 140 | 255 | 404 | 517 |
| Density | | | | |
| feed/effluents (kg/m³) | 853.7/838.0 | 861.1/836.8 | 857.2/834.2 | 853.7/837.8 |
| Sulfur | | | | |
| feed/effluents (mg/kg) | 13500/76 | 12950/400 | 11967/582 | 13500/162 |
| ΔT HDS (° C.) | Base | −13 | −16 | −5 |

TABLE 1-continued

Single-stage hydrotreatment of a mixture of rape oil and of straight-run gas oil

| Feed | Pure straight-run gas oil | Straight-run gas oil in comixture with rape oil (95/5% wt) | Straight-run gas oil in comixture with rape oil (85/15% wt) | Pure straight-run gas oil (return point) |
|---|---|---|---|---|
| Nitrogen | | | | |
| feed/effluents (mg/kg) | 126/13 | 116/32 | 113/37 | 126/19 |
| $H_2$ consumption (% wt/feed) | 0.43 | 0.48 | 0.57 | 0.40 |
| Cetane | | | | |
| feed/effluent | 56.6/59.2 | 55.6/59.1 | 53.7/60.1 | 56.6/58.8 |
| Cold properties feed/effluent | | | | |
| Cold filter-plugging point (° C.) | −3/−2 | −3/−2 | +1/+1 | −3/−2 |
| Cloud point (° C.) | +2/+1 | +1/+1 | +1/+1 | +2/+2 |

Example 2

Treatment of the Vegetable Oil Alone

Hydrotreatment of a DNS grade quality rape oil was carried out in an isothermal plant consisting of a fixed bed of descending flow type containing 50 cc catalyst of NiMo/$Al_2O_3$ in dense loading.

The characteristics of the straight-run gas oil are identical to those of the gas oil of Example 1. After in-situ sulfurization carried out at 350° C. in the plant under pressure by addition of 2% by weight of dimethyldisulfide to the straight-run gas oil, the feed was modified for a feed consisting of 100% rape oil. The hydrotreatment test was then conducted under the following operating conditions for 150 h:

| | |
|---|---|
| Total pressure (MPa rel): | 4 and 2.5 MPa |
| Temperature (° C.): | 320, 300, 280 |
| $H_2$/HC (Nl/l): | 320 |
| HSV ($h^{-1}$): | 1.6 |

The hydrogen consumption and the amount of CO and $CO_2$ formed are shown in Table 2.

It can be observed that, during hydrotreatment of a feed consisting of DNS quality rape oil at 320° C. under 4 MPa (not according to the invention), the hydrogen consumption is very high since it is 5.7% by weight in relation to the feed.

Besides, the production of water represents between 7.5 and 12.2% by weight of the feed according to the operating conditions, which leads to an acceleration of the phenomena of sintering of hydrotreating catalyst supports such as alumina.

The decrease of the temperature to 300° C. and the pressure decrease allow to lower this consumption to 4.8, then to 3.7% by weight by favouring decarboxylation and decarbonylation reactions in relation to the hydrodeoxygenation reaction. Thus, it is more advantageous in cases where the feed contains vegetable oils to operate at lower temperatures and pressures than those commonly used in the case of gas oil hydrotreatment in order to reduce the hydrogen consumption of the method.

TABLE 2

Two-stage hydrotreatment with inter-stage separation of a DNS grade quality rape oil

| Feed | T = 320° C. P = 4 MPa | T = 300° C. P = 4 MPa | T = 300° C. P = 2.5 MPa | T = 280° C. P = 2.5 MPa |
|---|---|---|---|---|
| Triglycerides conversion | | | | |
| (C=O bond of the ester IR band at 1751 $cm^{-1}$) | 100% | 100% | 100% | <100% |
| $H_2$ consumption | | | | |
| (% weight/feed) | 5.7 | 4.8 | 3.7 | not measured |
| Yields (% weight/feed) | | | | |
| CO | 0.4 | 0.6 | 0.8 | not measured |
| $CO_2$ | 5.3 | 6.4 | 7.8 | |
| $H_2O$ | 12.2 | 10.2 | 7.5 | |
| $C_3$ | 1.5 | 1.5 | 1.5 | |

Example 3

Analysis of the Used Catalysts Used in Examples 1 and 2

The used catalysts described in Example 1 for a feed consisting of a hydrocarbon cut that contains no vegetable oil and for a feed comprising 15% vegetable oil were analyzed.

The results of the elementary analyses of these catalysts after toluene reflux washing and 1-hour drying in a vacuum drier are given in Table 3. It can be observed that the introduction of rape oil in the feed accelerates coking of the catalyst used and that the S/Mo ratio that characterizes the stability of the sulfide phase decreases. Aging of the catalyst is thus accelerated by the presence of vegetable oil in comixture.

The specific surface area of these used catalysts was also measured by means of the BET method. It was observed that the introduction of rape oil in the feed leads to a decrease in the specific surface area of the used catalysts.

The characteristics of the used catalyst described in Example 2 are also given in Table 3. It can be seen that the trends observed for the hydrotreatment of a feed containing 15% rape oil are confirmed when a feed consisting of pure rape oil is used. Thus, the carbon content of the used catalyst of Example 2 is 4.9% by weight, its S/Mo ratio is still lower than that of the used catalysts of Example 1 and the BET surface area is 141 m$^2$/g.

TABLE 3

Elementary analyses and specific surface area of the used catalysts after hydrotreatment of a hydrocarbon feed, of a feed containing 15% rape oil in a single stage and of a feed consisting of rape oil alone

| Illustrated example | % wt rape oil in the mixture | C (% by weight) | H (% by weight) | S/Mo (molar ratio) | $S_{BET}$ (m$^2$/g) |
|---|---|---|---|---|---|
| 1 | 0 | 2.4 | 1.2 | 1.87 | 189 |
| 1 | 15 | 3.1 | 1.3 | 1.64 | 173 |
| 2 | 100 | 4.9 | 1.2 | 0.73 | 141 |

Example 4

Hydrotreatment of a Mixture of Rape Oil (DNS Quality) and of Atmospheric Distillation Gas Oil in Two Plants with Intermediate Separation Hydrotreatment of a feed consisting of a mixture containing variable proportions of rape oil was carried out in two stages. The first stage consists of a hydrotreatment at 300° C. under 2.5 MPa on a NiMo/alumina (50 cc) catalyst. Stripping of the effluents is then performed and the stripped feed is sent to a second pilot plant dedicated to deep hydrodesulfurization. This second pilot plant is operated at 350° C. under 3.3 MPa on a CoMo catalyst (50 cc). The characteristics of the effluents at the outlet of this second pilot plant are given in Table 4.

TABLE 4

Hydrotreatment in two stages of a mixture of rape oil and of straight-run gas oil

| Feed | Pure straight-run gas oil | Straight-run gas oil in comixture with rape oil (95/5% wt) | Straight-run gas oil in comixture with rape oil (85/15% wt) | Pure straight-run gas oil (return point) |
|---|---|---|---|---|
| Conditions | | | | |
| Catalyst age (h) | 130 | 263 | 410 | 513 |
| Density | | | | |
| feed/effluents (kg/m$^3$) | 853.7/838.0 | 861.1/836.8 | 857.2/834.2 | 853.7/837.8 |
| Sulfur | | | | |
| feed/effluents (mg/kg) | 13500/6 | 12950/10 | 11967/12 | 13500/7 |
| Δ T HDS (° C.) | Base | −4 | −6 | −3 |
| Nitrogen | | | | |
| feed/effluents (mg/kg) | 126/2 | 116/4 | 113/5 | 126/3 |
| Consumption in H$_2$ (% weight/feed) | 0.43 | 0.45 | 0.47 | 0.43 |
| Cetane | | | | |
| feed/effluent | 56.6/59.3 | 55.6/60.9 | 53.7/65.3 | 56.6/57.5 |
| Cold properties feed/effluent | | | | |
| Cold filter-plugging point (° C.) | −3/−2 | −3/−2 | −1/0 | −3/−2 |
| Cloud point (° C.) | +2/+1 | 0/0 | +0/+1 | +2/+2 |

Analysis of the effluent products shows that the co-treatment in two stages of straight-run gas oil and rape oil allows to obtain effluents with a higher cetane number (+3% with a 95/5 ratio, +8.7% with a 85/15 ratio) in relation to the single-stage method of Example 1 (not according to the invention).

The cold resistance properties are also greatly improved in relation to those of the initial vegetable oil (CFPP of about 20° C.) or of the effluent resulting from the hydrotreatment of the vegetable oil alone (CFPP of 20° C. also).

Concerning the effluent sulfur contents, it can be noted that, according to the two-stage method according to the invention, the effluent sulfur contents are below or very close to the 10 mg/kg limit imposed by the new European specifications in 2009. The single-stage method of comparative Example 1 led to gas oils with effluent sulfur contents above or equal to 400 mg/kg.

In conclusion, the effluents obtained by co-treatment of a straight-run gas oil with a vegetable oil with two-stage separation represent a very significant improvement for the integration of the effluents in the gas oil pool meeting the sulfur specifications.

Example 5

Analysis of the Used Catalysts Used in the Case of Example 4 (According to the Invention)

As before, the catalysts used in the first and in the second catalytic bed were analyzed after the tests. The values obtained are given in Table 5.

TABLE 5

Elementary analysis and specific surface area of the used catalysts after hydrotreatment carried out according to the method of the invention

| wt % rape oil in the mixture | Initial stage of the catalyst | C (% by weight) | H (% by weight) | S/Mo (molar ratio) | $S_{BET}$ (m²/g) |
|---|---|---|---|---|---|
| 0 | 1 | 2.4 | 1.2 | 1.87 | 185 |
| 0 | 2 | 2.1 | 1.0 | 1.93 | 187 |
| 5 | 1 | 2.6 | 1.3 | 1.82 | 179 |
| 5 | 2 | 2.4 | 1.3 | 1.86 | 187 |
| 15 | 1 | 3.1 | 1.3 | 1.72 | 173 |
| 15 | 2 | 2.4 | 1.2 | 1.83 | 185 |

By comparison with Example 3, it can be observed that co-treatment of the mixture made up of the hydrocarbon cut and of the vegetable oil leads to an S/Mo molar ratio that is closer to the stoichiometry of the $MoS_2$ compound, which shows that the pure vegetable oil destabilizes the active phase and therefore the stability and the life of the sulfide catalyst.

On the other hand, by comparison between the used catalysts of stage 1 and of stage 2, it is observed that the final hydrodesulfurization catalyst (stage 2) is preserved by the method according to the invention, which allows to obtain effluent sulfur contents in accordance with the specifications on the one hand and which provides, on the other hand, a longer cycle time with the same catalyst while limiting the hydrogen consumption.

Example 6

Hydrotreatment of a Mixture Made Up of Palm Oil and of Atmospheric Distillation Gas Oil in Two Plants with Intermediate Separation (According to the Invention)

Hydrotreatment of a mixture of gas oil and of palm oil was also carried out with the same feed and under the same conditions as in Example 4 according to the invention.

Figure 2:
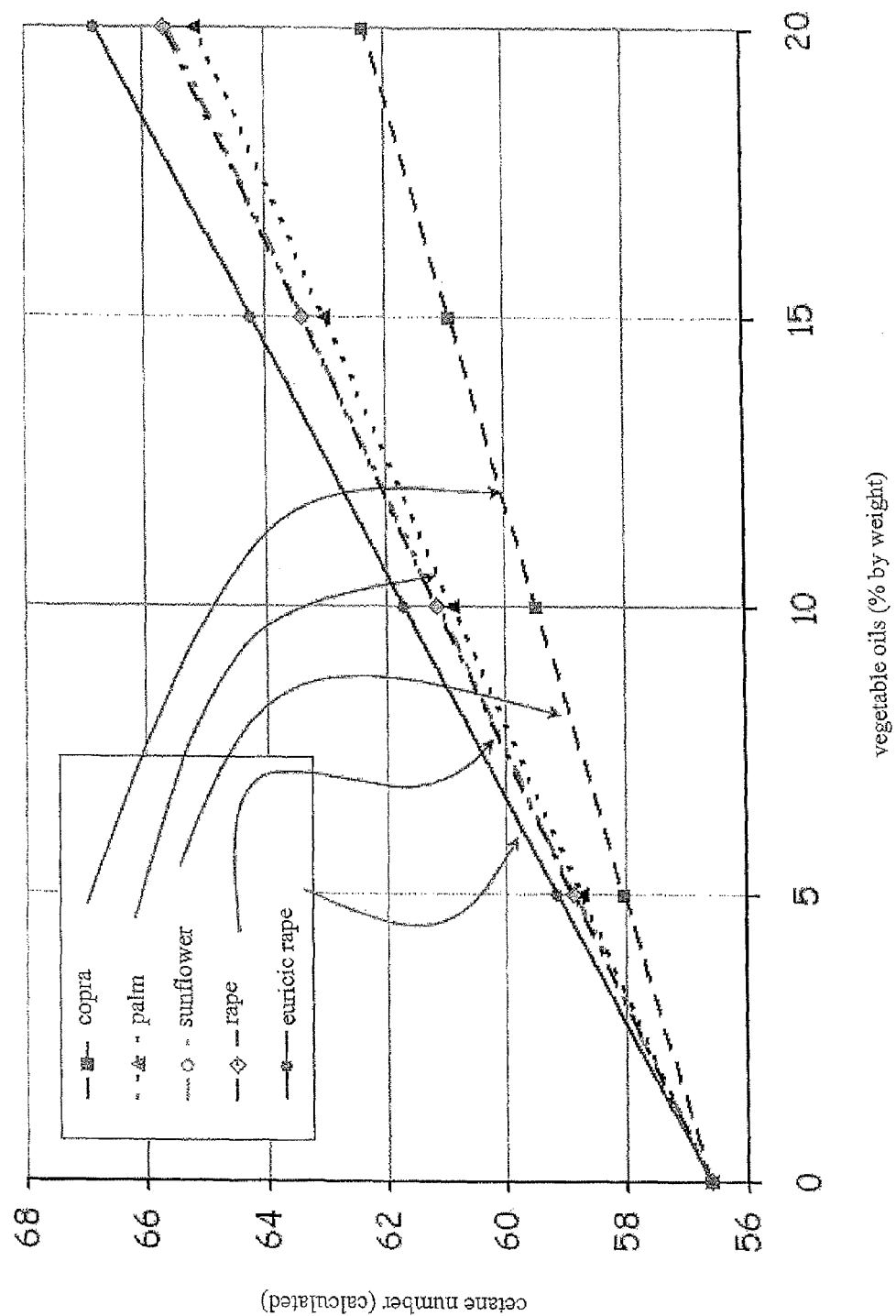
FIG. 2 shows the variation of the cetane number calculated as a function of the proportion of vegetable oils in comixture with a petroleum gas oil, for various oils.
Figure 3:
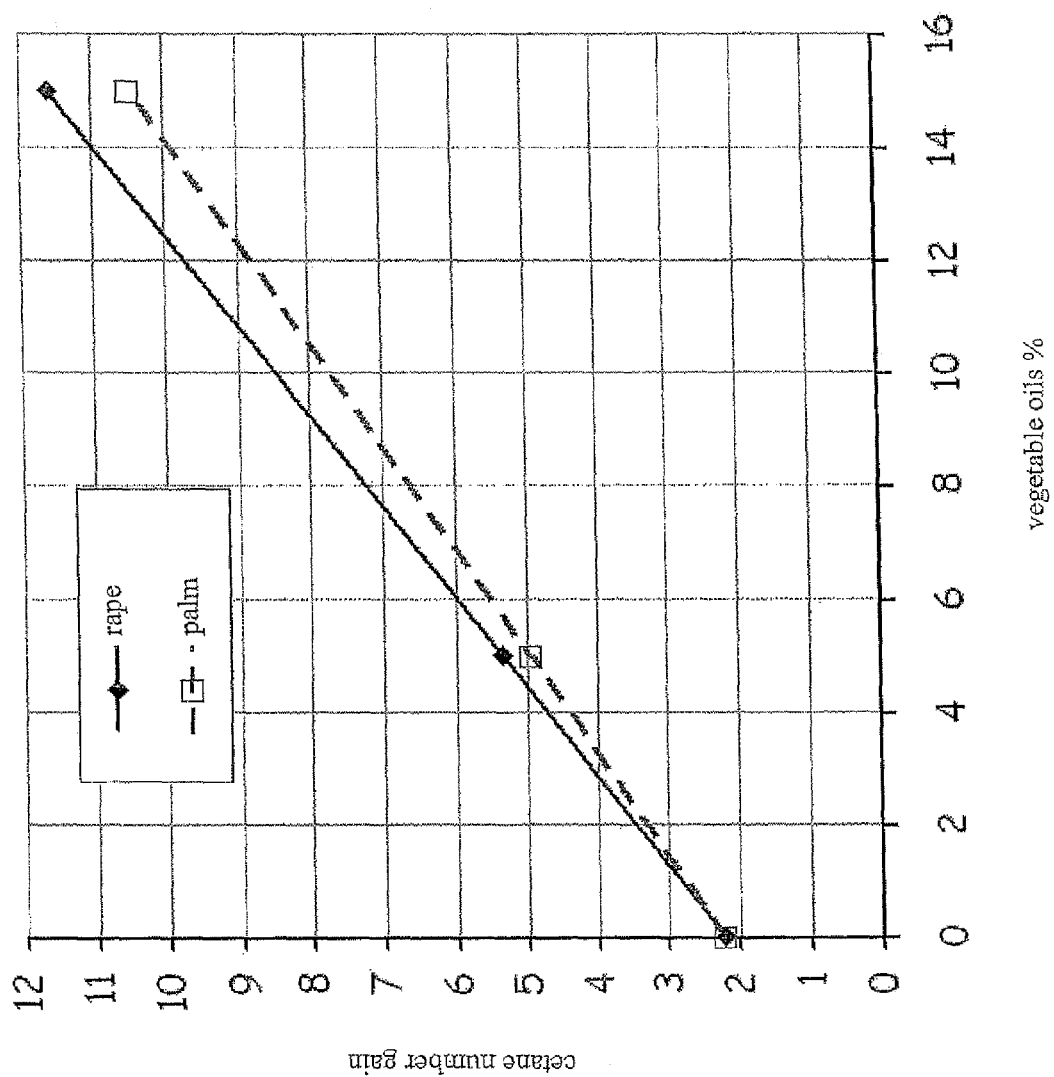
FIG. 3 shows the cetane number gain as a function of the proportion and of the type of vegetable oil introduced in the mixture.

The results in terms of cetane number obtained are shown in FIG. 3. The gains obtained are in accordance with the gains calculated from the correlations of the vegetable oil cetane numbers given in FIG. 2 and they confirm the advantage in terms of cetane number of the method according to the invention that also allows to limit the catalyst deactivation and the hydrogen consumption in relation to the methods of hydrotreating vegetable oils alone or in a single stage in comixture with a hydrocarbon feed of gas oil type.

Example 7

Comparative

Hydrotreatment of a Mixture of Rape Oil (DNS Quality) and of Atmospheric Distillation Gas Oil in Two Plants with Intermediate Separation Under the Conditions Described in the Prior Art (EP-4,693,432)

Hydrotreatment of a feed made up of a mixture containing variable proportions of rape oil of DNS quality was carried out in two stages. The first stage consists of a hydrotreatment at 350° C. under 10 MPa on a CoMo/alumina (50 cc) catalyst. Stripping of the effluents was then carried out and the stripped effluent was sent to a second pilot plant dedicated to deep hydrodesulfurization. This second pilot plant was operated at 350° C. under 7 MPa on a CoMo (50 cc) catalyst. The characteristics of the effluents at the outlet of this second pilot plant and the overall hydrogen consumptions are given in Table 6.

TABLE 6

Hydrotreatment in two stages of a mixture of rape oil and of straight-run gas oil under the conditions of the prior art

| Feed | Pure straight-run gas oil | Straight-run gas oil in comixture with rape oil (95/5% by weight) | Straight-run gas oil in comixture with rape oil (85/15% by weight) | Pure straight-run gas oil (return point) |
|---|---|---|---|---|
| Conditions | | | | |
| Catalyst age (h) | 150 | 263 | 410 | 513 |
| Density feed/effluents (kg/m³) | 853.7/838.5 | 861.1/837.1 | 857.2/834.5 | 853.7/837.8 |

TABLE 6-continued

Hydrotreatment in two stages of a mixture of rape oil and of straight-run gas oil under the conditions of the prior art

| Feed | Pure straight-run gas oil | Straight-run gas oil in comixture with rape oil (95/5% by weight) | Straight-run gas oil in comixture with rape oil (85/15% by weight) | Pure straight-run gas oil (return point) |
|---|---|---|---|---|
| Sulfur | | | | |
| feed/effluents (mg/kg) | 13500/non measurable | 12950/non measurable | 11967/2 | 13500/98 |
| Δ T HDS (° C.) | Base | | | −22° C. |
| H$_2$ consumption (% by weight/feed) | 0.44 | 0.72 | 1.29 | 0.43 |
| Cetane | | | | |
| feed/effluent | 56.6/59.5 | 55.6/60.3 | 53.7/62.7 | 56.6/56 |

The hydrogen consumption was measured for the co-treatment in two stages with stripping of a straight-run gas oil and of a mixture in variable proportions of rape oil under the conditions described in patent application EP-1,693,432 and the result is shown in Table 6: this combination generates higher hydrogen consumptions (+173% in the case of a (85/15 wt %) mixture) in relation to Example 4 (according to the invention) because of too severe hydrotreatment conditions in the first stage. This increase is mainly due to the fact that, under such operating conditions, hydrodeoxygenation is favoured in relation to the decarboxylation and/or decarbonylation reactions.

The sulfur contents of the effluents are very low under these conditions in the case of a straight-run gas oil (non measurable value). This reveals a very insufficient H$_2$S partial pressure in the second hydrotreatment reactor, after stripping, which induces fast degradation of the metallic phase and its deactivation, as shown by the values obtained for the return point (22° C. deactivation). Furthermore, the increase in the vegetable oil content induces no HDS performance degradation, considering the very severe operating conditions and the elimination of the reaction by-products such as CO during the intermediate stripping, in relation to Example 1 (not according to the invention).

The effluents globally have higher cetane numbers in comparison with the single-stage method of Example 1 (not according to the invention), but they are lower than those of Example 4 (according to the invention), thanks to the selectivity of the triglyceride conversion reaction.

In conclusion, the effluents obtained by co-treatment in two stages of a straight-run gas oil with a vegetable oil under the conditions described in the prior art penalize the refiner because of a very high hydrogen consumption and of a lower gain in terms of product properties, as in the case of cetane, in relation to Example 4 according to the invention. This is explained by too severe hydrotreatment conditions in the first stage, inducing hydrodeoxygenation reactions, and an insufficient H$_2$S pressure during the second hydrotreatment stage.

The catalyst having worked during stage 2 in the absence of sulfur (total desulfurization during the first stage), its deactivation is very high (see Table 7).

TABLE 7

Elementary analysis and specific surface area of the used catalysts after return point after a hydrotreatment carried out according to the method used

| | C (% by weight) | H (% by weight) | S/Mo (molar ratio) | S$_{BET}$ (m$^2$/g) |
|---|---|---|---|---|
| 1 stage | 2.4 | 1.2 | 1.87 | 189 |
| 2 stages according to the invention (Example 4) | 3.1 | 1.3 | 1.7 | 160 |
| 2 stages according to the prior art (EP-1, 693,432) 350° C. | 6.2 | 1.2 | 0.4 | 140 |

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The entire disclosures of all applications, patents and publications, cited herein and of corresponding French application No. 06/11409, filed Dec. 22, 2006 are incorporated by reference herein.

The invention claimed is:

1. A method of hydrotreating a feed comprising a mixture consisting of an oil of vegetable or animal origin (1 to 99% by volume) and of a petroleum cut (99 to 1% by volume) so as to obtain a fuel base at least containing less than 50 mg/kg sulfur, said process comprising:
   a) a first hydrotreatment stage in a fixed-bed reactor HDT1 with at least one catalyst at a temperature of 180° C. to 360° C., a total pressure of 0.5 to 20 MPa, an hourly space velocity of 0.1 to 20 h$^{-1}$ and in the presence of 50 to 2000 Nl hydrogen per liter of feed,
   b) an intermediate stripping stage to eliminate carbon monoxide (CO), carbon dioxide (CO$_2$), water (H$_2$O), hydrogen sulfide (H$_2$S) and ammonia (NH$_3$) formed during the first hydrotreatment stage,
   c) a second hydrotreatment stage in a fixed-bed reactor HDS2 with at least one catalyst at a temperature of 180° C. to 450° C., a total pressure of 0.5 to 30 MPa, an hourly space velocity of 0.1 to 20 h$^{-1}$ and in the presence of 50 to 2000 Nl hydrogen per liter of feed; wherein the first hydrotreatment stage (a) is conducted at a lower temperature that the second hydrotreatment stage (c).

2. A method as claimed in claim 1, wherein stage a) is operated at a temperature ranging between 190° C. and 350° C., at a pressure ranging between 1 and 10 MPa and at a space velocity of 0.2 to 5 $h^{-1}$.

3. A method as claimed in claim 1, wherein the hydrogen is fed as a counter-current stream to the mixture in reactor HDT1.

4. A method as claimed in claim 1, wherein stage c) is operated at a temperature ranging between 250° C. and 440° C., at a pressure ranging between 1 and 25 MPa, and at a space velocity of 0.2 to 4 $h^{-1}$.

5. A method as claimed in claim 1, wherein each stage comprises one or more reactors and/or one or more catalyst beds.

6. A method as claimed in claim 1, wherein said oil is a vegetable oil predominantly comprising fatty acids as triglycerides having long alkyl chains comprising 8 to 24 carbon atoms.

7. A method as claimed in claim 6, wherein the vegetable oil is selected from among the following oils: rape, erucic rape, soybean, sunflower or oleic sunflower, palm, copra and palm-nut oil, or a mixture of these oils and their derivatives.

8. A method as claimed in claim 1, wherein the petroleum cut is a hydrocarbon fraction whose boiling point ranges between 130° C. and 410° C.

9. A method as claimed in claim 8, wherein the hydrocarbon fraction comprises a gas oil or diesel cut.

10. A method as claimed in claim 8, wherein the gas oil cut is obtained from straight distillation, catalytic cracking or a conversion process such as coking, visbreaking or hydroconversion of residues.

11. A method as claimed in claim 1, wherein the hydrotreatment catalyst comprises at least one metal from group VIB and/or at least one metal from group VIII of the periodic table of elements.

12. A method as claimed in claim 11, wherein the catalyst comprises a cobalt-molybdenum (CoMo), nickel-molybdenum (NiMo) or nickel-tungsten (NiW) pair.

13. A method as claimed in claim 11, wherein the catalyst further comprises phosphorus, boron and/or fluorine.

14. A method as claimed in claim 1, wherein each reaction stage uses an identical or different catalyst.

15. A method as claimed in claim 1, wherein the oil is mixed with the petroleum cut after preheating said petroleum cut in the presence of hydrogen by passage through a feed/effluent heat exchanger and or then through a preheat furnace.

16. A method as claimed in claim 1, wherein the oil is mixed with the petroleum cut in the presence of hydrogen after preheating said petroleum cut by passage through a feed/effluent heat exchanger.

17. A method as claimed in claim 1, wherein the oil is mixed with the petroleum cut in the presence of hydrogen prior to preheating.

18. A method as claimed in claim 17, wherein the mixture obtained is preheated by passage through a feed/effluent heat exchanger and/or a preheat furnace.

19. A method as claimed in claim 1, wherein mixing the oil and the hydrocarbon cut is carried out before introduction of the hydrogen.

20. A method as claimed in claim 1, wherein mixing the oil of vegetable or animal origin and the hydrocarbon cut is carried out in the presence of hydrogen.

21. A method as claimed in claim 1, wherein the hydrogen introduced in stage a) consists, in a proportion ranging from 1 to 100% by volume, of recycle hydrogen from hydrodesulfurization reactor HDS2.

22. A method according to claim 1, wherein the feed comprises a mixture of oils comprising 1-50% of vegetable oil by volume and 99-50% by volume of a petroleum cut.

23. A method according to claim 1, wherein the oil is of vegetable origin.

24. A method according to claim 23, wherein the oil comprises rape oil.

25. A method according to claim 24, wherein the temperature difference between stages (a) and (c) is on the order of about 50° C.

26. A method according to claim 1, wherein the hydrotreatment catalysts are sulphurized catalysts combining at least one metal from group VIB with a metal from group VIII.

27. A method according to claim 26, wherein the catalysts are from the group of CoMo, NiMo and NiW.

28. A method according to claim 25, wherein the first hydrotreatment stage is conducted with a Ni/Mo/$Al_2O_3$ catalyst and second hydrotreatment stage is conducted with CoMo catalyst.

* * * * *